United States Patent [19]

Miyashita et al.

[11] 4,268,412
[45] May 19, 1981

[54] METHOD FOR CONTINUOUSLY MANUFACTURING HIGH-TEMPERATURE REDUCING GAS

[75] Inventors: Tsuneo Miyashita, Yokohama; Yoshio Sato, Kamakura; Yoshitsugu Ando, Yokohama, all of Japan

[73] Assignee: Nippon Kokan Kabushiki Kaisha, Tokyo, Japan

[21] Appl. No.: 91,561

[22] Filed: Nov. 5, 1979

[30] Foreign Application Priority Data

Nov. 30, 1978 [JP] Japan .................. 53-147209

[51] Int. Cl.³ .................. C10K 3/06; C01B 2/22; C10B 2/28
[52] U.S. Cl. .................. 252/373; 252/188; 252/372; 75/34; 75/35
[58] Field of Search .................. 252/188, 372, 373; 75/34, 35

[56] References Cited

U.S. PATENT DOCUMENTS 3,909,446  9/1975  Miyashita et al. .................. 252/188
4,048,091  9/1977  Barnaba .................. 75/34

FOREIGN PATENT DOCUMENTS 54-71096  6/1979  Japan .

Primary Examiner—Richard E. Schafer
Assistant Examiner—Irwin Gluck
Attorney, Agent, or Firm—Frishauf, Holtz, Goodman & Woodward

[57] ABSTRACT

A method for continuously manufacturing a high-temperature reducing gas, comprising: using a reducing gas manufacturing equipment including a heat medium heating apparatus and a gas reforming apparatus provided below said heat medium heating apparatus; burning a fuel gas in said heat medium heating apparatus to continuously produce a high-temperature combustion exhaust gas; on the other hand, introducing heat medium particles having an average particle size within the range of from 50 to 500 $\mu$m into said heat medium heating apparatus to heat to a prescribed temperature and fluidize said particles through heat exchange with said high-temperature combustion exhaust gas; blowing a gas to be reformed containing $CO_2$ and $H_2O$ and a hydrocarbon-containing gas into said gas reforming apparatus, while introducing said heated and fluidized particles from said heat medium heating apparatus into said gas reforming apparatus; thereby heating said gas to be reformed and said hydrocarbon-containing gas, through heat exchange with said heated and fluidized particles, in said gas reforming apparatus to reform by reaction said gas to be reformed and said hydrocarbon-containing gas into a high temperature reducing gas rich in $H_2$ and CO; and then, feeding said fluidized particles cooled through said heat exchange with said gas to be reformed and said hydrocarbon-containing gas back into said heat medium heating apparatus, thereby continuously manufacturing a high-temperature reducing gas while using said fluidized particles in recycle.

4 Claims, 3 Drawing Figures

METHOD FOR CONTINUOUSLY MANUFACTURING HIGH-TEMPERATURE REDUCING GAS

REFERENCE TO PATENTS, APPLICATIONS AND PUBLICATIONS PERTINENT TO THE INVENTION

As far as we know, the prior document pertinent to the present invention is Japanese Patent Provisional Publication No. 71,096/79 dated June 7, 1979.

The contents of the prior art disclosed in the above-mentioned prior document will be discussed under the heading of the "BACKGROUND OF THE INVENTION".

A copy of the above-mentioned prior document is attached hereto.

FIELD OF THE INVENTION

The present invention relates to a method for continuously manufacturing a high-temperature reducing gas rich in $H_2$ and CO by causing a gas to be reformed such as a top gas containing $CO_2$ and $H_2O$ discharged from a reduction furnace such as a blast furnace and a shaft furnace for manufacturing reduced iron to react with a hydrocarbon-containing gas.

BACKGROUND OF THE INVENTION

For the purpose of reforming a gas to be reformed such as a top gas containing $CO_2$ and $H_2O$, discharged from a reduction furnace such as a blast furnace and a shaft furnace for manufacturing reduced iron (hereinafter simply referred to as a "top gas"), into a reducing gas mainly comprising $H_2$ and CO, the following three method are conventionally known:

(1) Method using a reforming tube filled with a catalyst

This method comprises reforming a gas to be reformed into a reducing gas, in a reforming tube filled with a catalyst, by means of external heat at a temperature of from 750° to 850° C. This method is widely adopted for reforming steam into a reducing gas rich in carbon monoxide (CO). As an example of this method, the Midrex method, developed by Midland-Ross Corporation of the United States, comprising reforming $CO_2$ gas into a reducing gas rich in CO is known. This method is advantageous in that it allows continuous operations and permits easy maneuvering.

(2) Method using a regenerator type gas reforming furnace

This method comprises, by means of a gas reforming furnace of a heat-accumulating type, alternately repeating a heat-accumulating period and a heat-radiating period, i.e., a gas-reforming period, at certain time intervals, adjusting the atmosphere in the gas reforming furnace by switching over between the heat-accumulating period and the heat-radiating period, and causing a gas to be reformed to react with a hydrocarbon-containing gas in the gas reforming furnace at a temperature of from 1,200° to 1,300° C., thereby manufacturing a reducing gas. As an example of this method, the method based on the Kowper type methane decomposition furnace is known, which comprises manufacturing a reducing gas by causing steam to react with methane gas. There are also available the Purofer method, developed by Hüttenwerk Oberhausen AG of West Germany, comprising manufacturing a reducing gas by reforming $CO_2$ gas and the method comprising causing a top gas to react with a hydrocarbon-containing gas to manufacture a reducing gas and blowing the resultant reducing gas into a reduction furnace such as a blast furnace and a shaft furnace for manufacturing reduced iron, thereby using the top gas in recycle. This method is advantageous in that, because a gas to be reformed is reformed at a high temperature of at least 1,200° C., the amount of produced soot, i.e., decomposed carbon, is slight and it is possible to utilize a higher hydrocarbon-containing gas.

(3) Method of partially oxidizing a gas to be reformed by means of oxygen

This method comprises oxidizing a part of a hydrocarbon-containing gas by means of pure oxygen to generate $CO_2$ and $H_2O$, and causing the resultant $CO_2$ and $H_2O$ to react with the remaining hydrocarbon-containing gas, thereby manufacturing a reducing gas. A known example of this method is the Texaco method. This method is advantageous in that it requires only a very simple equipment and permits use of light oil and even heavy oil in place of a hydrocarbon-containing gas.

The methods (1) to (3) described above have however the following problems. In the method (1) mentioned above, higher hydrocarbon-containing gases other than methane gas cannot be used because of the production of a large quantity of soot, i.e., decomposed carbon. Use of a raw material gas containing large quantities of impurities such as sulfur leads to serious deterioration of the catalyst. Because of the restriction in strength of the material of the reforming tube, the attainable reforming temperature is from 700° to 850° C. at the maximum, and consequently, the temperature is somewhat insufficient to allow blowing of the resultant reducing gas into a blast furnace or a shaft furnace for manufacturing reduced iron. In the above-mentioned method (2), operations are rather complicated because of the need to open and close a plurality of valves at high temperatures for alternately switching over between a heat-accumulating period and a heat-radiating period, i.e., a gas-reforming period. In order to continuously manufacture a reducing gas, furthermore, it is necessary to install at least two reforming furnaces of a heat-accumulating type, thus resulting in higher installation costs. The above-mentioned method (3) is also problematic in that the use of pure oxygen requires high running costs and causes production of a large quantity of soot, i.e., decomposed carbon, during manufacture of reducing gas.

With a view to solving the problems involved in the above-mentioned methods (1) to (3), therefore, a method for manufacturing a reducing gas was proposed in Japanese Patent Provisional Publication No. 71,096/79 dated June 7, 1979 (corresponding to Japanese Patent Application No. 131,496/77), which comprises:

heating pebbles to be used in recycle to a prescribed temperature, in a pebble heating chamber, by combustion heat of a fuel gas; dividing said heated pebbles into two flows, one being introduced into a counter-flow type preheating chamber of gas to be reformed, and the other, into a parallel-flow type reforming chamber, both provided below said pebble heating chamber through dropping by their own weight; blowing a gas to be reformed containing $CO_2$ and $H_2O$ into said preheating chamber of gas to be reformed to preheat said gas to be reformed to a prescribed temperature through heat exchange with said heated pebbles in said preheating chamber of gas to be reformed, while, on the other hand, preheating a hydrocarbon-containing gas to a prescribed temperature by a preheating means; introducing said preheated gas to be reformed and said preheated hydrocarbon-containing gas into a mixing chamber for mixing; introducing the resultant gas mixture into said reforming chamber; reforming by reaction said gas mixture into a reducing gas rich in $H_2$ and CO by heating said gas mixture through heat exchange with said heated pebbles in said reforming chamber; and utilizing in recycle said pebbles cooled to about 300° C. through said heat exchange in said preheating chamber of gas to be reformed and said reforming chamber, by feeding said pebbles back into said pebble heating chamber by means of a transporting means such as a belt conveyor and an elevator (hereinafter referred to as the "prior invention").

The above-mentioned prior invention is described more in detail with reference to FIG. 1. FIG. 1 is a schematic descriptive drawing illustrating a reducing gas manufacturing equipment used for applying the method of the above-mentioned prior invention. As shown in FIG. 1, pebbles 34, having an average particle size within a prescribed range, to be used in recycle are fed into a pebble heating chamber 36 by an elevator 35, where pebbles 34 are heated to a temperature of about 1,500° C. through heat exchange with combustion exhaust gases at a temperature of about 1,500° C. produced as a result of combustion of a fuel gas, coming from a combustion chamber 46. The combustion exhaust gases cooled to a temperature of about 300° C. through the heat exchange with the pebbles 34 are discharged to outside the system from the pebble heating chamber 36. The pebbles 34 heated to a temperature of about 1,500° C. are divided into two flows and drop by their own weight into a counter-flow type preheating chamber of gas to be reformed 38 and a parallel-flow type reforming chamber 37, both provided below the pebble heating chamber 36. A gas to be reformed, containing $CO_2$ and $H_2O$, such as a top gas, discharged from a reduction furnace such as a blast furnace and a shaft furnace for manufacturing reduced iron, is blown into the preheating chamber of gas to be reformed 38, where the gas to be reformed is preheated to a temperature of about 1,300° C. through heat exchange with the heated pebbles 34 and then introduced into a mixing chamber 44. The pebbles 34, in the preheating chamber of gas to be reformed 38, cooled to a temperature of about 300° C. through the heat exchange with the gas to be reformed are discharged onto a belt conveyor 40. On the other hand, a hydrocarbon-containing gas such as a natural gas is preheated to a temperature of about 600° C. by a preheating means 45, and then introduced into the mixing chamber 44. The gas to be reformed preheated to a temperature of about 1,300° C. and the hydrocarbon-containing gas preheated to a temperature of about 600° C. are rapidly mixed in the mixing chamber 44 and are converted into a gas mixture. Rapid mixing almost prevents soot, i.e., decomposed carbon from being produced. The resultant gas mixture is introduced into the parallel-flow type reforming chamber 37, where the gas mixture is heated through heat exchange with the pebbles 34 heated to a temperature of about 1,500° C. and is reformed by reaction into a high-temperature reducing gas at a temperature of about 1,200° C. rich in $H_2$ and CO, and the resultant reducing gas is taken out from the system. The pebbles 34, in the reforming chamber 37, cooled to a temperature of about 1,200° C. through the heat exchange with the gas mixture drop by their own weight into a counter-flow type air preheating chamber 39 provided below the parallel-flow type reforming chamber 37. A part of the pebbles 34 in the reforming chamber 37 drop by their own weight also into the preheating chamber of gas to be reformed 38 to replenish the pebbles 34 in the preheating chamber of gas to be reformed 38. Air at the room-temperature is blown into the air preheating chamber 39, where the air is heated to a temperature of about 850° C. through heat exchange with the pebbles 34 at a temperature of about 1,200° C., and then introduced into the combustion chamber 46 as an oxygen source for combustion of a fuel gas in the combustion chamber 46. The pebbles 34, in the air preheating chamber 39, cooled to a temperature of about 300° C. through the heat exchange with the air are discharged onto the belt conveyor 40.

The pebbles 34 discharged onto the belt conveyor 40 from the preheating chamber of gas to be reformed 38 and the air preheating chamber 39 are sieved through a screen 41 provided near the end of the belt conveyor 40 to remove pebbles reduced in size by abrasion and breakage, and the remaining pebbles having particles sizes within a prescribed range are fed back into the pebble heating chamber 36 by means of the elevator 35 for use in recycle. To make up the under-screen portion of the pebbles having passed through the screen 41, fresh pebbles 34 are fed from a pebble replenishing tank 42 from time to time into the elevator 35. The pebbles 34 flow in circulation through the above-mentioned reducing gas manufacturing equipment in this manner, and the flow rate of the pebbles 34 is adjusted by two wiper type scrubbing means 43 each provided at the pebble exit of the preheating chamber of gas to be reformed 38 and at the pebble exit of the air preheating chamber 39.

The above-mentioned prior invention has the following excellent advantages:

(1) Since it is not necessary to open and close valves at high temperatures, operation is easy and a high-temperature reducing gas can be continuously manufactured.

(2) The amount of soot, i.e., decomposed carbon produced during manufacture of a reducing gas is very small.

(3) Use of pebbles as a heat medium leads to a high thermal efficiency.

(4) The manufactured reducing gas, having a high temperature as about 1,200° C., can be blown without any further treatment such as preheating into a reduction furnace such as a blast furnace and a shaft furnace for manufacturing reduced iron pellets.

The above-mentioned prior invention has in contrast the following problems. When light pebbles with a small particle size are used, for example in the counter-flow type preheating chamber of gas to be reformed 38, pebbles 34 cannot drop by their own weight but reversely flows upwardly under the effect of the pressure of the gas to be reformed flowing upwardly. In the prior invention, therefore, it is necessary to use heavy pebbles with a relatively large particle size. This requires installation of large-scale circulation facilities of pebbles such as a belt conveyor 40 and an elevator 35, resulting in disadvantages in the required space and the installation costs.

SUMMARY OF THE INVENTION

The most important object of the present invention is therefore to provide a method for continuously manufacturing a high-temperature reducing gas, which permits use of fluidized particles as a heat medium.

Another important object of the present invention is to provide a method for continuously manufacturing a high-temperature reducing gas, which requires only a small space for equipment and low installation costs.

An object of the present invention is to provide a method for continuously manufacturing a high-temperature reducing gas, which gives a high thermal efficiency.

Another object of the present invention is to provide a method for continuously manufacturing a high-temperature reducing gas capable of being blown into a reduction furnace such as a blast furnace and a shaft furnace for manufacturing reduced iron without preheating.

A further another object of the present invention is to provide a method for continuously manufacturing a high-temperature reducing gas, which permits easy operation.

An additional object of the present invention is to provide a method for continuously manufacturing a high-temperature reducing gas, which produces only a small amount of soot, i.e., decomposed carbon. In accordance with one of the features of the present invention, there is provided a method for continuously manufacturing a high-temperature reducing gas, which comprises:

using a reducing gas manufacturing equipment including a heat medium heating apparatus and a gas reforming apparatus provided below said heat medium heating apparatus, said heat medium heating apparatus comprising a heat exchange chamber for heating of the upper stage and a combustion chamber for heating of the lower stage, said gas reforming apparatus comprising a reaction chamber for reforming of the upper stage and a heat exchange chamber for reforming of the lower stage;

burning a fuel gas in said combustion chamber for heating to continuously produce a high-temperature combustion exhaust gas, and, causing said produced high-temperature combustion exhaust gas to continuously flow upwardly from said combustion chamber for heating into said heat exchange chamber for heating;

on the other hand, introducing heat medium particles having an average particle size within the range of from 50 to 500 $\mu$m into said heat exchange chamber for heating, to preheat and fluidize said particles through heat exchange with said high-temperature combustion exhaust gas, then, introducing said preheated and fluidized particles into said combustion chamber for heating, to heat said preheated and fluidized particles further to a prescribed temperature through heat exchange with said high-temperature combustion exhaust gas;

continuously blowing a gas to be reformed containing $CO_2$ and $H_2O$ and a hydrocarbon-containing gas into said heat exchange chamber for reforming, and, causing said gas to be reformed and said hydrocarbon-containing gas to continuously flow upwardly from said heat exchange chamber for reforming into said reaction chamber for reforming, while continuously introducing said heated fluidized particles from said combustion chamber for heating into said reaction chamber for reforming; thereby heating said gas to be reformed and said hydrocarbon-containing gas through heat exchange with said heated fluidized particles in said reaction chamber for reforming, to continuously reform by reaction said gas to be reformed and said hydrocarbon-containing gas into a high-temperature reducing gas rich in $H_2$ and $CO$; then, introducing said heated fluidized particles from said reaction chamber for reforming into said heat exchange chamber for reforming, to preheat said gas to be reformed and said hydrocarbon-containing gas in said heat exchange chamber for reforming; and then, feeding said fluidized particles cooled through said heat exchange with said gas to be reformed and said hydrocarbon-containing gas in said reaction chamber for reforming and said heat exchange chamber for reforming back into said heat exchange chamber for heating;

thereby continuously manufacturing a high-temperature reducing gas while using said fluidized particles in recycle.

DETAILED DESCRIPTION OF PREFERRED EMBODIMENTS

Figure 1:
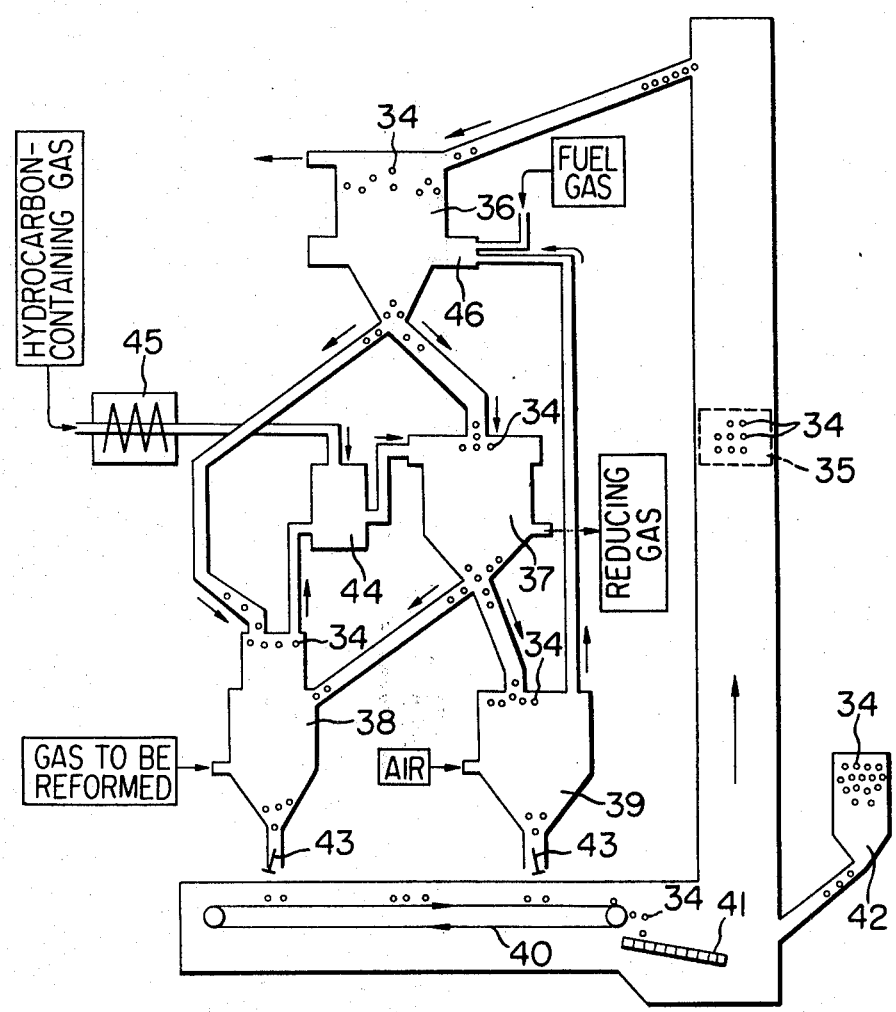
FIG. 1 is a schematic descriptive drawing illustrating a reducing gas manufacturing equipment used for applying a conventional method for manufacturing a reducing gas.

With a view to solving the problems involved in the aforementioned conventional methods for manufacturing a reducing gas, particularly, in the prior invention described in detail above, i.e., the prior invention disclosed in Japanese Patent Provisional Publication No. 71,096/79, we made extensive studies. As a result, we found that it is possible to solve all the above-mentioned problems and to continuously manufacture a high-temperature reducing gas effectively at a high efficiency by easy operation, requiring only a small space for equipment and low installation costs, by using particles having an average particle size within the range of from 50 to 500 $\mu$m capable of being fluidized by a gas pressure as a heat medium, in place of the relatively heavy pebbles with a relatively large particle size used as the heat medium in the prior invention.

The present invention was made on the basis of the above-mentioned findings, and the method for continuously manufacturing a high-temperature reducing gas of the present invention comprises:

using a reducing gas manufacturing equipment including a heat medium heating apparatus and a gas reforming apparatus provided below said heat medium heating apparatus, said heat medium heating apparatus comprising a heat exchange chamber for heating of the upper stage and a combustion chamber for heating of the lower stage, said gas reforming apparatus comprising a reaction chamber for reforming of the upper stage and a heat exchange chamber for reforming of the lower stage;

burning a fuel gas in said combustion chamber for heating to continuously produce a high-temperature combustion exhaust gas, and, causing said produced high-temperature combustion exhaust gas to continuously flow upwardly from said combustion chamber for heating into said heat exchange chamber for heating;

on the other hand, introducing heat medium particles having an average particle size within the range of from 50 to 500 μm into said heat exchange chamber for heating, to preheat and fluidize said particles through heat exchange with said high-temperature combustion exhaust gas, then, introducing said preheated and fluidized particles into said combustion chamber for heating, to heat said preheated and fluidized particles further to a prescribed temperature through heat exchange with said high-temperature combustion exhaust gas;

continuously blowing a gas to be reformed containing $CO_2$ and $H_2O$ and a hydrocarbon-containing gas into said heat exchange chamber for reforming, and, causing said gas to be reformed and said hydrocarbon-containing gas to continuously flow upwardly from said heat exchange chamber for reforming into said reaction chamber for reforming, while continuously introducing said heated fluidized particles from said combustion chamber for heating into said reaction chamber for reforming;

thereby heating said gas to be reformed and hydrocarbon-containing gas through heat exchange with said heated fluidized particles in said reaction chamber for reforming, to continuously reform by reaction said gas to be reformed and said hydrocarbon-containing gas into a high-temperature reducing gas rich in $H_2$ and CO; then, introducing said heated fluidized particles from said reaction chamber for reforming into said heat exchange chamber for reforming, to preheat said gas to be reformed and said hydrocarbon-containing gas in said heat exchange chamber for reforming; and then, feeding said fluidized particles cooled through said heat exchange with said gas to be reformed and said hydrocarbon-containing gas in said reaction chamber for reforming and said heat exchange chamber for reforming back into said heat exchange chamber for heating;

thereby continuously manufacturing a high-temperature reducing gas while using said fluidized particles in recycle.

Figure 2:
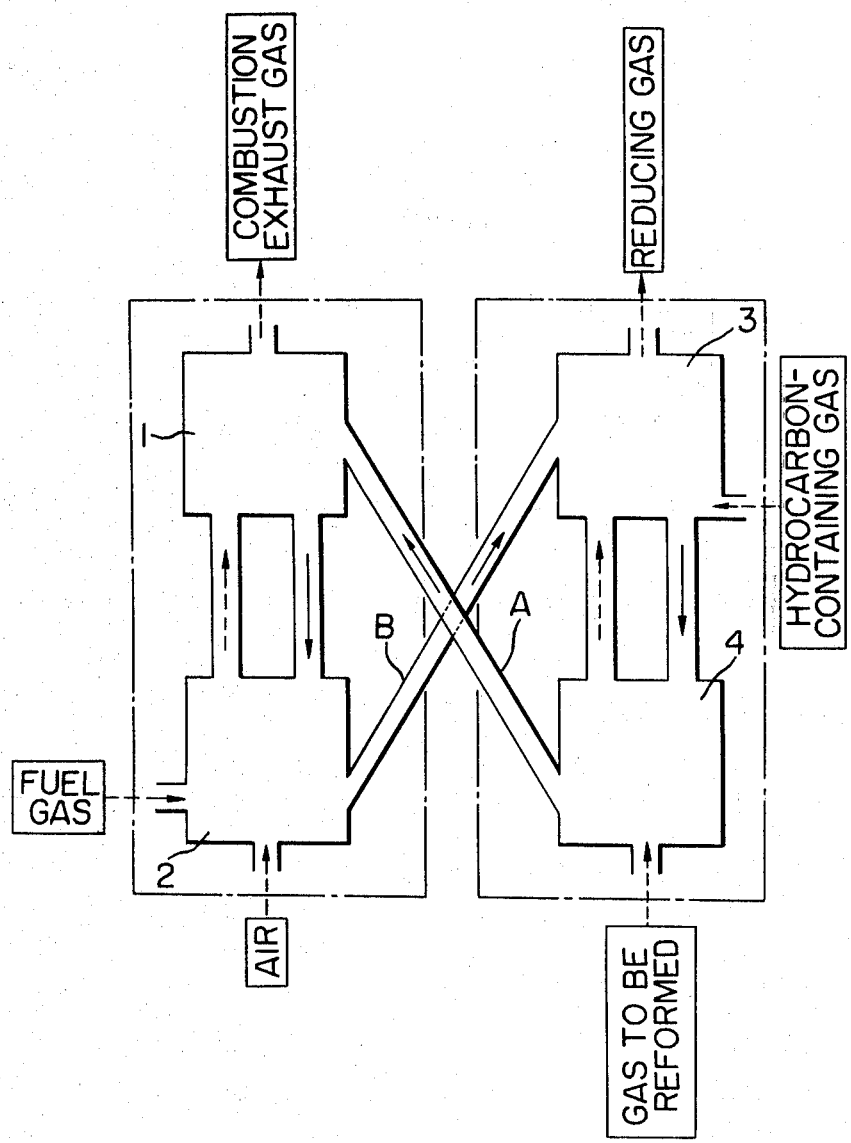
FIG. 2 is a schematic descriptive drawing illustrating the basic principle of the method for continuously manufacturing a high-temperature reducing gas of the present invention; and, FIG. 3 is a schematic descriptive drawing illustrating the reducing gas manufacturing equipment used for applying the method for continuously manufacturing a high-temperature reducing gas of the present invention.

The basic principle of the present invention is first described with reference to FIG. 2. FIG. 2 is a schematic descriptive drawing illustrating the basic principle of the method for continuously manufacturing a high-temperature reducing gas of the present invention. In the method of the present invention, a reducing gas manufacturing equipment including a heat medium heating apparatus and a gas reforming apparatus is used. As shown in FIG. 2, the heat medium heating apparatus comprises a heat exchange chamber for heating 1 and a combustion chamber for heating 2 provided below the heat exchange chamber for heating 1, and the gas reforming apparatus comprises a reaction chamber for reforming 3 and a heat exchange chamber for reforming 4 provided below the reaction chamber for reforming 3. The heat exchange chamber for heating 1 and the heat exchange chamber for reforming 4 are mutually communicated via a heat medium transporting pipe A, and the combustion chamber for heating 2 and the reaction chamber for reforming 3 are mutually communicated via another heat medium transporting pipe B.

In the present invention, heat resistant particles such as alumina particles, having an average particle size within the range of from 50 to 500 μm, capable of being fluidized by the pressure of a gas flowing upwardly in the above-mentioned reducing gas manufacturing equipment are employed as heat medium particles. In FIG. 2, the arrows with a solid line show the flow direction of the heat medium particles, and the arrows with a dotted line indicate the flow direction of gases. The heat medium particles are fluidized by the pressure of gases flowing upwardly through said chambers 1, 2, 3 and 4. The heat medium particles thus fluidized are hereinafter referred to as the "fluidized particles".

The basic principle of the present invention lies in that the fluidized particles are heated in the above-mentioned heat medium heating apparatus, and a gas to be reformed containing $CO_2$ and $H_2O$ and a hydrocarbon-containing gas are heated through heat exchange with said heated fluidized particles in the above-mentioned gas reforming apparatus to continuously reform by reaction said gas to be reformed and said hydrocarbon-containing gas into a reducing gas mainly comprising $H_2$ and CO.

More specifically, as shown in FIG. 2, the fluidized particles cooled to a temperature of about 900° C. through heat exchange with the gas to be reformed in the heat exchange chamber for reforming 4 described later are introduced through the heat medium transporting pipe A from the heat exchange chamber for reforming 4 into the heat exchange chamber for heating 1, where the fluidized particles are preheated to a temperature of about 1,200° C. through heat exchange with a high-temperature combustion exhaust gas from the combustion chamber for heating 2 described later. Then, the preheated fluidized particles are introduced into the combustion chamber for heating 2, where said preheated fluidized particles are further heated to a temperature of about 1,400° C. through heat exchange with the high-temperature exhaust gas produced by feeding a fuel gas and air. On the other hand, the combustion exhaust gas having preheated and heated the fluidized particles is discharged to outside the system from the top of the heat exchange chamber for heating 1.

The fluidized particles heated to a temperature of about 1,400° C. are introduced from the combustion chamber for heating 2 through the other heat medium transporting pipe B into the reaction chamber for reforming 3. A gas to be reformed such as a top gas, containing $CO_2$ and $H_2O$, discharged from a reduction furnace such as a blast furnace and a shaft furnace for manufacturing reduced iron is preheated to a temperature of about 900° C. in the heat exchange chamber for reforming 4, and then blown into the reaction chamber for reforming 3. On the other hand, a hydrocarbon-containing gas such as a natural gas is blown directly into the reaction chamber for reforming 3. The hydrocarbon-containing gas may be blown into the reaction chamber for reforming 3 after preheating in the heat exchange chamber for reforming 4, as in the case of the gas to be reformed.

The gas to be reformed and the hydrocarbon-containing gas are heated in the reaction chamber for reforming through heat exchange with the fluidized particles heated to a temperature of about 1,400° C., and continuously reformed by reaction into a high-temperature reducing gas of about 1,200° C. rich in $H_2$ and CO. The high-temperature reducing gas thus manufactured is taken out from the system through the top of the reaction chamber for reforming 3.

The fluidized particles, cooled to a temperature of about 1,200° C. through heat exchange with the gas to be reformed and the hydrocarbon-containing gas in the reaction chamber for reforming 3, are introduced into the heat exchange chamber for reforming 4. On the other hand, the gas to be reformed is blown into the heat exchange chamber for reforming 4, where the gas to be reformed is preheated to a temperature of about 900° C. through heat exchange with the fluidized particles of a temperature of about 1,200° C., and then introduced into the reaction chamber for reforming 3 as described above. The fluidized particles, cooled to a temperature of about 900° C. through heat exchange with the gas to be reformed, are introduced from the heat exchange chamber for reforming 4 through the heat medium transporting pipe A into the heat exchange chamber for heating 1, where the fluidized particles are preheated to a temperature of about 1,200° C. as described above.

The high-temperature reducing gas is thus continuously manufactured by using the fluidized particles in recycle in the above-mentioned reducing gas manufacturing equipment, and the use of the fluidized particles as the heat medium is one of the most important features of the method of the present invention.

The average particle size of the heat medium particles used in the method of the present invention should be within the range of from 50 to 500 $\mu m$. Because, with an average particle size of under 50 $\mu m$, the particle size is too small and the particles flow, entrapped by ascending gases, whereas an average particle size of over 500 $\mu m$ makes it impossible to fluidize the particles by the gas pressure.

Figure 3:
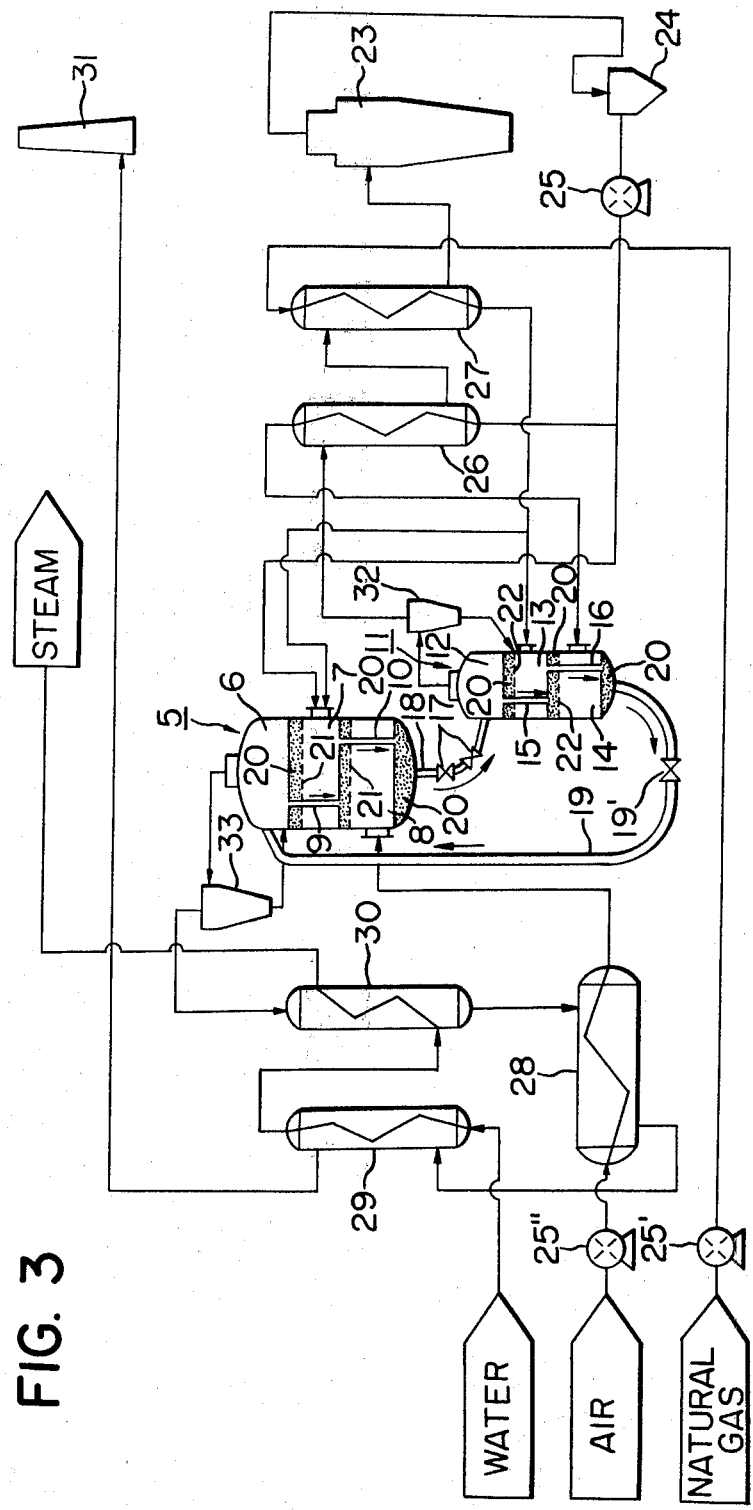

Now, the method for continuously manufacturing a high-temperature reducing gas of the present invention is described in detail by means of an example with reference to FIG. 3.

EXAMPLE

FIG. 3 is a schematic descriptive drawing illustrating the reducing gas manufacturing equipment used in this example for applying the method for continuously manufacturing a high-temperature reducing gas of the present invention. Table 1 shows chemical compositions of the natural gas used as the hydrocarbon-containing gas, the top gas of a shaft furnace for manufacturing reduced iron used as the gas to be reformed and the manufactured reducing gas in this example.

TABLE 1

|  | $N_2$ | $H_2$ | CO | $CO_2$ | $H_2O$ | $CH_4$ | $C_2H_4$ |
|---|---|---|---|---|---|---|---|
| Natural gas | 3.8 | — | — | 5.4 | — | 88.1 | 2.7 |
| Top gas | 2.5 | 43.8 | 17.7 | 27.6 | 8.4 | — | — |
| Manufactured reducing gas | 2.0 | 50.7 | 38.4 | 2.7 | 6.2 | — | — |

In this example, alumina particles having an average particle size within the range of from 50 to 500 $\mu m$ were used as heat medium particles.

In the method of the present invention, as shown in FIG. 3, a reducing gas manufacturing equipment is used, which includes a heat medium heating apparatus 5 and a gas reforming apparatus 11 provided below the heat medium heating apparatus 5. The heat medium heating apparatus 5 and the gas reforming apparatus 11 have substantially the same structure and functions respectively as those of the heat medium heating apparatus and the gas reforming apparatus described as to the basic principle of the method of the present invention mentioned above with reference to FIG. 2.

More specifically, the heat medium heating apparatus 5 comprises a heat exchange chamber for heating 6 of the upper stage, a combustion chamber for heating 7 of the middle stage, and a bottom chamber for heating 8 of the lower stage. A partition Plate 21, having a structure allowing free passage of gases but not allowing passage of heat medium particles, separates the heat exchange chamber for heating 6 from the combustion chamber for heating 7, and the combustion chamber for heating 7 from the bottom chamber for heating 8. Gases therefore flow upwardly, as described later, from the bottom chamber for heating 8 of the lower stage, through the combustion chamber for heating 7 of the middle stage, into the heat exchange chamber for heating 6 of the upper stage via the respective partition plates 21. Furthermore, the heat exchange chamber for heating 6 and the combustion chamber for heating 7 are mutually communicated via a downcomer 9, and the combustion chamber for heating 7 and the bottom chamber for heating 8 are mutually communicated via a downcomer 10. As described later, therefore, the heat medium particles move downwardly from the heat exchange chamber for heating 6 of the upper stage, through the combustion chamber for heating 7 of the middle stage, into the bottom chamber for heating 8 of the lower stage via the downcomers 9 and 10.

The gas reforming apparatus 11 comprises a reaction chamber for reforming 12 of the upper stage, a heat exchange chamber for reforming 13 of the middle stage, and a bottom chamber for reforming 14 of the lower stage. Another partition plate 22, having a structure allowing free passage of gases but not allowing passage of heat medium particles, separates the reaction chamber for reforming 12 from the heat exchange chamber for reforming 13, and the heat exchange chamber for reforming 13 from the bottom chamber for reforming 14. Gases therefore flow upwardly, as described later, from the bottom chamber for reforming 14 of the lower stage, through the heat exchange chamber for reforming 13 of the middles stage, into the reaction chamber for reforming 12 of the upper stage via the respective partition plates 22. Furthermore, the reaction chamber for reforming 12 and the heat exchange chamber for reforming 13 are mutually communicated via a downcomer 15, and the heat exchange chamber for reforming 13 and the bottom chamber for reforming 14 are mutually communicated a downcomer 16. As described later, therefore, the heat medium particles move downwardly from the reaction chamber for reforming 12 of the upper stage, through the heat exchange chamber for reforming 13 of the middle stage, into the bottom chamber for reforming 14 of the lower stage via the downcomers 15 and 16.

The bottom chamber for heating 8 and the reaction chamber for reforming 12 are mutually communicated via a heat medium transporting pipe 18 equipped with a dual valve 17. As described later, therefore, the heat medium particles in the bottom chamber for heating 8 move downwardly from the bottom chamber for heating 8, through the heat medium transporting pipe 18, into the reaction chamber for reforming 12. The bottom chamber for reforming 14 and the heat exchange chamber for heating 6 are mutually communicated via a riser 19. As described later, therefore, the heat medium particles in the bottom chamber for reforming 14 move upwardly from the bottom chamber for reforming 14 through the riser 19 into the heat exchange chamber for heating 6.

The flow of the heat medium particles is described first.

As shown in FIG. 3, the heat medium particles 20, cooled to a temperature of about 900° C. through the heat exchange described later with the top gas of a shaft furnace for manufacturing reduced iron (hereinafter referred to as the "top gas") used as the gas to be reformed and the natural gas used as the hydrocarbon-containing gas in the heat exchange chamber for reforming 13, are introduced through the bottom chamber for reforming 14 and the riser 19, into the heat exchange chamber for heating 6 at a rate of 35 tons per hour, where the heat medium particles 20 are preheated to a temperature of about 1,200° C. through heat exchange with a high-temperature combustion exhaust gas from the combustion chamber for heating 7 produced by the combustion of a fuel gas as described later, and fluidized. The heat medium particles thus fluidized are hereinafter referred to as the "fluidized particles".

The fluidized particles 20 preheated to a temperature of about 1,200° C. are introduced, as shown by the arrow in the drawing, from the heat exchange chamber for heating 6, through the downcomer 9, into the combustion chamber for heating 7, where the fluidized particles 20 are heated, as described later, to a temperature of about 1,400° C. through heat exchange with the high-temperature combustion exhaust gas, and then, as shown by the arrow in the drawing, introduced through the downcomer 10 into the bottom chamber for heating 8. Then, the fluidized particles of a temperature of about 1,400° C. in the bottom chamber for heating 8 are introduced through the heat medium transporting pipe 18 into the reaction chamber for reforming 12, as shown by the arrows in the drawing, by opening and closing alternately the dual valve 17 provided on the way of the heat medium transporting pipe 18. The dual valve 17 is provided on the way of the heat medium transporting pipe 18 with a view to preventing the reducing gas manufactured as described later in the reaction chamber for reforming 12 from flowing into the heat medium heating apparatus 5. In order to prevent air as the oxygen source described later from mixing with the manufactured reducing gas, it is desirable to seal the dual valve 17 with steam or an inert gas.

The top gas from the shaft furnace for manufacturing reduced iron, which was used as the gas to be reformed, having the chemical composition as shown in Table 1 and flowing at a rate of about 5,700 Nm$^3$/hour, and the natural gas, which was used as the hydrocarbon-containing gas, having the chemical composition as shown in Table 1 and flowing at a rate of about 1,160 Nm$^3$/hour are blown, as described later, into the reaction chamber for reforming 12, where the top gas and the natural gas are heated through heat exchange with the fluidized particles heated to a temperature of about 1,400° C., and, as described later, reformed by reaction into a reducing gas of a temperature of about 1,200° C. The fluidized particles 20, cooled to a temperature of about 1,200° C. through heat exchange with the top gas and the natural gas are, as shown by the arrow in the drawing, introduced from the reaction chamber for reforming 12, through the downcomer 15, into the heat exchange chamber for reforming 13, where the fluidized particles 20 preheat the top gas and the natural gas to be blown into the reaction chamber for reforming 12 to a temperature of about 900° C. through heat exchange as described later. The fluidized particles 20, cooled to a temperature of about 900° C. through heat exchange with the top gas and the natural gas, are introduced, as shown by the arrow in the drawing, from the heat exchange chamber for reforming 13, through the downcomer 16, into the bottom chamber for reforming 14.

Under the effect of the difference in pressure between the heat medium heating apparatus 5 and the gas reforming apparatus 11 and the pressure of steam (not shown) blown upwardly into the riser 19, the fluidized particles 20 of a temperature of about 900° C. in the bottom chamber for reforming 14 are transferred upwardly, as shown by the arrow in the drawing, through the riser 19 into the heat exchange chamber for heating 6, where the fluidized particles 20, cooled to a temperature of about 900° C., are preheated to a temperature of about 1,200° C. through heat exchange with a high-temperature combustion exhaust gas, as described later.

The fluidized particles 20, i.e., the heat medium particles 20 are used in recycle through the reducing gas manufacturing equipment in the manner as mentioned above. The flow rate of the heat medium particles 20 is adjusted by operating an adjusting valve 19' provided on the way of the riser 19.

Now, the flow of various gases is described.

The top gas from the shaft furnace for manufacturing reduced iron 23, which has the chemical composition as shown in Table 1 with a temperature of about 550° C. and flows at a rate of about 9,000 Nm$^3$/hour, is converted by a scrubber 24 into a top gas with a temperature of about 50° C. flowing at a rate of about 7,640 Nm$^3$/hour, and then, increased in pressure by a blower 25, and simultaneously heated to about 100° C. Out of the top gas of a temperature of about 100° C. flowing at a rate of about 7,640 Nm$^3$/hour from the blower 25, a portion corresponding to a flow rate of about 1,940 Nm$^3$/hour is blown into the combustion chamber for heating 7 as a fuel gas. The remaining top gas corresponding to a flow rate of about 5,700 Nm$^3$/hour is heated to a temperature of about 500° C. in a top gas heater 26, then blown into the bottom chamber for reforming 14 as a gas to be reformed, and flows upwardly through the partition plate 22 into the heat exchange chamber for reforming 13. Heating of the top gas in the top gas heater 26 is effected, as described later, through heat exchange with the manufactured high-temperature reducing gas.

The natural gas, which was used as the hydrocarbon-containing gas, having the chemical composition as shown in Table 1, with a temperature of about 50° C. and flowing at a rate of about 1,900 Nm$^3$/hour, are introduced by a blower 25' into a natural gas heater 27, where the natural gas is heated to a temperature of about 300° C. Heating of the natural gas in the natural gas heater 27 is effected, as described later, through heat exchange with the manufactured high-temperature reducing gas. Out of the natural gas of a temperature of about 300° C. flowing at a rate of about 1,900 Nm$^3$/hour from the natural gas heater 27, a portion corresponding to a flow rate of about 740 Nm$^3$/hour is blown into the combustion chamber for heating 7 as a fuel gas. The remaining natural gas corresponding to a flow rate of about 1,160 Nm$^3$/hour is blown into the heat exchange chamber for reforming 13. The natural gas of a flow rate of about 740 Nm$^3$/hour as the fuel gas may not be blown into the combustion chamber for heating 7. The remaining natural gas of a flow rate of about 1,160 Nm³/hour may be blown directly into the reaction chamber for reforming 12 in place of being blown into the heat exchange chamber for reforming 13, or may be blown into the bottom chamber for reforming 14 as in the case of the top gas of a flow rate of about 5,700 Nm³/hour as the gas to be reformed.

The top gas of a flow rate of about 5,700 Nm³/hour and the natural gas of a flow rate of about 1,160 Nm³/hour are, as described above, preheated to a temperature of about 900° C., in the heat exchange chamber for reforming 13, through heat exchange with the fluidized particles 20 of a temperature of about 1,200° C., and flows upwardly through the partition plate 22 into the reaction chamber for reforming 12.

The top gas of a flow rate of about 5,700 Nm³/hour and the natural gas of a flow rate of about 1,160 Nm³/hour are reformed by reaction, in the reaction chamber for reforming 12 as mentioned above, into a reducing gas having the chemical composition as shown in Table 1 with a temperature of about 1,200° C. and flowing at a rate of about 9,000 Nm³/hour, through heat exchange with the fluidized particles 20 of a temperature of about 1,400° C.

The reducing gas thus manufactured is introduced into a cyclone 32, where the reducing gas in separated from the fine heat medium particles entrapped therein, then introduced into the top gas heater 26, where the reducing gas is cooled, as mentioned above, to a temperature of about 950° C. through heat exchange with the top gas, then introduced into the natural gas heater 27, where the reducing gas is cooled, as mentioned above, to a temperature of about 880° C. through heat exchange with the natural gas, and then, blown into the shaft furnace for manufacturing reduced iron 23 to reduce raw materials charged therein.

Air of a temperature of about 30° C. flowing at a rate of about 11,200 Nm³/hour is introduced by a blower 25" into an air heater 28, where the air is heated to a temperature of about 600° C., then blown, as the source of oxygen for combustion, into the bottom chamber for heating 8, and flows upwardly through the partition plate 21 into the combustion chamber for heating 7.

The above-mentioned top gas flowing at a rate of about 1,940 Nm³/hour as the fuel gas and the natural gas flowing at a rate of about 740 Nm³/hour as the fuel gas produce, under the supply of the air at a flow rate of about 11,200 Nm³/hour, a high-temperature combustion exhaust gas of a temperature of about 1,400° C. flowing at a rate of about 13,300 Nm³/hour through combustion in the combustion chamber for heating 7. The high-temperature combustion exhaust gas heats, as mentioned above, the fluidized particles 20 to a temperature of about 1,400° C. through heat exchange in the combustion chamber for heating 7, and then flows upwardly through the partition plate 21 into the heat exchange chamber for heating 6, where the combustion exhaust gas preheats the fluidized particles 20 to a temperature of about 1,200° C. through heat exchange.

The high-temperature combustion exhaust gas cooled to a temperature of about 1,200° C. through heat exchange with the fluidized particles 20 in the combustion chamber for heating 7 and the heat exchange chamber for heating 6 is introduced into a cyclone 33, where the combustion exhaust gas is separated from the fine heat medium particles entrapped therein, then introduced into a boiler 30, where the combustion exhaust gas is cooled, as described later, to a temperature of about 900° C. through heat exchange with water, then introduced into the air heater 28, where the combustion exhaust gas is cooled, as mentioned above, to a temperature of about 500° C. through heat exchange with the air, then introduced into a water heater 29, where the combustion exhaust gas is cooled, as described later, to a temperature of about 375° C. through heat exchange with water, and then the combustion exhaust gas is discharged to open air through a stack 31.

Water of a temperature of about 20° C. is heated, as described above, to a temperature of about 200° C. through heat exchange with the high-temperature combustion exhaust gas in the water heater 29, and then, further heated through heat exchange with the high-temperature combustion exhaust gas in the boiler 30 into steam of a temperature of about 215° C. flowing at a rate of about 3.6 tons/hour. The steam thus obtained is used for various uses such as the steam for sealing the dual valve 17 as mentioned above, and as the steam blown into the riser 19 for transferring the fluidized particles 20 from the bottom chamber for reforming 14 into the heat exchange chamber for heating 6, whereby the heat of the high-temperature combustion exhaust gas is effectively recovered.

The heat medium particles collected in the cyclone 32 are returned into the heat exchange chamber for reforming 13, and the heat medium particles collected in the cyclone 33, into the heat exchange chamber for heating 6, for use in recycle. To replenish inevitable exhaustion of the heat medium particles, fresh heat medium particles are from time to time fed into the heat exchange chamber for heating 6.

In the method of the present invention, as described above in detail, use of particles having an average particle size within the range of from 50 to 500 μm as heat medium particles eliminates the necessity of large-scale heat medium circulating facilities such as a belt conveyor and an elevator as in the aforementioned prior invention, thus requiring only a small space for equipment and low installation and running costs. Furthermore, since the heat medium particles used in the method of the present invention have a small average particle size, the heat exchange ratio, i.e., the thermal efficiency is very high, thus permitting continuous manufacture of a high-temperature reducing gas at a high efficiency, and thus providing many industrially useful effects.

What is claimed is:

1. A method for continuously manufacturing a high-temperature reducing gas, which comprises:

using a reducing gas manufacturing equipment including a heat medium heating apparatus and a gas reforming apparatus provided below said heat medium heating apparatus, said heat medium heating apparatus comprising a heat exchange chamber for heating of the upper stage and a combustion chamber for heating of the lower stage, said gas reforming apparatus comprising a reaction chamber for reforming of the upper stage and a heat exchange chamber for reforming of the lower stage;

burning a fuel gas in said combustion chamber for heating to continuously produce a high-temperature combustion exhaust gas, and, causing said produced high-temperature combustion exhaust gas to continuously flow upwardly from said combustion chamber for heating into said heat exchange chamber for heating;

on the other hand, introducing heat medium particles having an average particle size within the range of from 50 to 500 μm into said heat exchange chamber for heating, to preheat and fluidize said particles through heat exchange with said high-temperature combustion exhaust gas, then, introducing said preheated and fluidized particles into said combustion chamber for heating, to heat said preheated and fluidized particles further to a prescribed temperature through heat exchange with said high-temperature combustion exhaust gas;

continuously blowing a gas to be reformed containing $CO_2$ and $H_2O$ and a hydrocarbon-containing gas into said heat exchange chamber for reforming, and, causing said gas to be reformed and said hydrocarbon-containing gas to continuously flow upwardly from said heat exchange chamber for reforming into said reaction chamber for reforming, while continuously introducing said heated fluidized particles from said combustion chamber for heating into said reaction chamber for reforming;

thereby heating said gas to be reformed and said hydrocarbon-containing gas through heat exchange with said heated fluidized particles in said reaction chamber for reforming, to continuously reform by reaction said gas to be reformed and said hydrocarbon-containing gas into a high-temperature reducing gas rich in $H_2$ and CO; then, introducing said heated fluidized particles from said reaction chamber for reforming into said heat exchange chamber for reforming, to preheat said gas to be reformed and said hydrocarbon-containing gas in said heat exchange chamber for reforming; and then, feeding said fluidized particles cooled through said heat exchange with said gas to be reformed and said hydrocarbon-containing gas in said reaction chamber for reforming and said heat exchange chamber for reforming back into said heat exchange chamber for heating;

thereby continuously manufacturing a high-temperature reducing gas while using said fluidized particles in recycle.

2. The method as claimed in claim 1, wherein:
said gas to be reformed and said hydrocarbon-containing gas to be blown into said heat exchange chamber for reforming are preheated by means of a part of the heat of said manufactured high-temperature reducing gas.

3. The method as claimed in claim 1, wherein:
air as a source of oxygen for the combustion of said fuel gas in said combustion chamber for heating is preheated by means of a part of the heat of said high-temperature combustion exhaust.

4. The method as claimed in claim 1, wherein:
steam is produced by means of a part of the heat of said high-temperature combustion exhaust gas.

* * * * *